United States Patent [19]

Sollman

[11] 3,869,481

[45] Mar. 4, 1975

[54] 17ALPHA-ALKANOYLOXY-6ALPHA-METHYL-3BETA-TRIALKYL-SILOXY-PREGN-4-EN-20-ONES

[75] Inventor: Paul B. Sollman, Wilmette, Ill.

[73] Assignee: G. D. Searle & Co., Chicago, Ill.

[22] Filed: Nov. 23, 1973

[21] Appl. No.: 418,458

Related U.S. Application Data

[63] Continuation-in-part of Ser. No. 181,230, Sept. 16, 1971, abandoned.

[52] U.S. Cl. ............................ 260/397.4, 424/243 J
[51] Int. Cl. .......................................... C07c 169/32
[58] Field of Search ................................. 260/397.4

[56] References Cited

UNITED STATES PATENTS

| 3,126,399 | 3/1964 | Sollman | 260/397.4 |
|---|---|---|---|
| 3,671,555 | 6/1972 | Teichmuller et al. | 260/397.4 |

Primary Examiner—Elbert L. Roberts
Attorney, Agent, or Firm—John M. Brown

[57] ABSTRACT

Preparation and the selective pepsin-inhibiting and progestational activity of 17α-alkanoyloxy-6α-methyl-3β-trialkylsiloxypregn-4-en-20-ones are disclosed.

3 Claims, No Drawings

17ALPHA-ALKANOYLOXY-6ALPHA-METHYL-3BETA-TRIALKYL-SILOXYPREGN-4-EN-20-ONES

This application is a continuation-in-part of my copending application Ser. No. 181,230 filed Sept. 16, 1971, now abandoned.

This invention relates to 17α-alkanoyloxy-6α-methyl-3β-trialkylsiloxypregn-4-en-20-ones. More particularly, this invention provides new, useful and unobvious chemical compounds having the formula

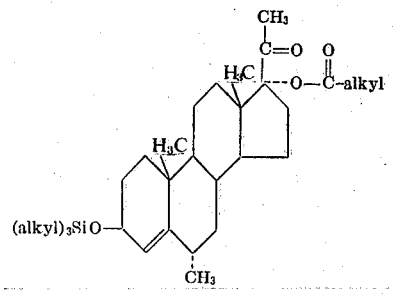

Among the alkyls called for by the foregoing formula, lower alkyls are preferred, which is to say methyl, ethyl, propyl, isopropyl, butyl, isobutyl, sec.-butyl, tert.-butyl, pentyl, neopentyl, hexyl, isohexyl, and like monovalent, saturated, acyclic, straight- or branched-chain, hydrocarbon radicals of empirical formula

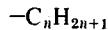

wherein $n$ represents a positive integer less than 8. Whether these radicals are the same, or different, in the enformulated compounds is not critical for the purposes hereof.

The compounds of this invention are useful by reason of their valuable and selective biological properties. Thus, for example, they are progestational and pepsin-inhibiting, but not estrogenic.

The progestational utility of the instant compounds is evident from results of the following standardized test, which is a modification of the well-known procedure described by Clauberg in C. Zentr. Gynakol., 54, 2757 (1930): To each of a group of 3-4 immature, female rabbits weighing about 1 kg. and primed with 17β-estradiol by subcutaneously injecting 5 μg. thereof per animal on each of six successive days, test compound dissolved or suspended in corn oil is subcutaneously administered on each of five successive days beginning the next day after the last priming injection. Commonly, the initial daily dosage is 1 mg. of compound in 0.1 ml. of corn oil. other animals likewise administered corn oil alone serve as controls. On the sixth day after the last priming injection, the animals are sacrificed; and a segment of each uterus is taken for histological examination whereby the degree of arborization of the endometrial glands is graded in accordance with a method similar to that described by McPhail in J. Physiol., 83, 145 (1934). A +1 response represents the effect of estrogen priming alone and is indicated by the absence of glandular proliferation. A +2 response is induced in the estrogen-primed animals by approximately 0.05 mg. of progesterone administered subcutaneously, and is considered to represent minimal progestational activity. Responses in the range +3 to +4 reflect potent progestational effects typical of those produced by larger doses (~0.1 mg.) of subcutaneously administered progesterone. If the average rating for the test animals is less than +2 at the 1 mg. dose level, the compound is considered inactive. If the average rating at this dose is greater than +2, the test is repeated with compound administered in amounts decreased according to the progression 0.5, 0.2, 0.1, 0.05, 0.02, 0.01 . . . mg. until a dose insufficient to produce an average response of +2 can be determined. Potency of the compound in per cent, relative to progesterone, is then calculated by dividing the next higher dose into 0.05 and multiplying by 100. A preferred embodiment of this invention, 17α-acetoxy-6α-methyl-3β-trimethylsiloxypregn-4-en-20-one, was found active in this test, its potency ranging from 1 to 5 times that of progesterone The pepsin-inhibiting utility of the instant compounds is evident from results of the standardized test for this property described in U.S. Pat. No. 3,475,420. In that test, 17α-acetoxy-6α-methyl-3β-trimethylsiloxypregn-4-en-20-one was found to produce a 10 percent inhibition of the proteolysis of hemoglobin by pepsin.

The aforesaid biological activities are the more interesting because 17α-acetoxy-3β-hydroxy-6α-methylpregn-4-en-20-one, which is presumably typical of a group of compounds claimed in U.S. Pat. No. 3,126,399 all distinguished from the compounds of this invention by the absence of a 3-trialkylsilyl grouping, was found 25 times as potent as progesterone but devoid of pepsin-inhibiting activity in the tests referred to. Moreover, the specified prior art 3β-ol was found to be a potent estrogen (effective subcutaneously at doses as low as 10 μgm.) in the standardized test for estrogenicity described in U.S. Pat. No. 3,501,506, whereas 17α-acetoxy-6α-methyl-3β-trimethylsiloxypregn-4-en-20-one was inactive in that test. Contrary, therefore, to what has sometimes been suggested, the biological effects of trialkylsilyl substitution are clearly not predictable. Further documentation of this unpredictability can be found in U.S. Pat. No. 3,560,532, where compounds of Formula II are distinguished from compounds of Formula III as corticoid and progestational agents, respectively; yet certain compounds can be structurally represented by both formulas (when Z = methylene, R and $R^1$ = methyl, $R^7$ = lower alkanoyloxy, $R^8$ = lower alkyl, $R^{10}$ and Y = hydrogen, and $R^{11}$ = oxo).

Those skilled in the art will recognize that observations of activity in standardized tests for particular biological effect are fundamental to the development of valuable new drugs, both veterinary and human.

Preparation of the instant compounds proceeds by contacting a compound of the formula

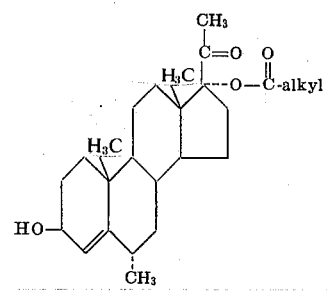

with a chlorosilane of the formula

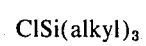

in pyridine solution. Addition to the reaction mixture of the corresponding hexaalkyldisilazane (alkyl)₃SiNHSi(alkyl)₃ appears to enhance the yield.

The following examples describe in detail compounds illustrative of the present invention and methods which have been devised for their preparation. It will be apparent to those skilled in the art that many modifications, both of materials and of methods may be practiced without departing from the purpose and intent of this disclosure. Throughout the examples hereinafter set forth, temperatures ae given in degrees centigrade and relative amounts of materials in parts by weight, except as otherwise noted.

EXAMPLE 1

17α-Acetoxy-6α-methyl-3β-trimethylsiloxypregn-4-en-20-one. To a solution of 3 parts of 17α-acetoxy-3β-hydroxy-6α-methylpregn-4-en-20-one in 30 parts of pyridine is added approximately 9 parts of hexamethyldisilazane, followed by approximately 3 parts of trimethylchlorosilane. The reactants are thoroughly mixed and then allowed to stand for 15 minutes, whereupon 240 parts of pentane is introduced. The resultant mixture is washed with water, dried over anhydrous sodium sulfate, and stripped of solvent by vacuum distillation. The residue is chromatographed on silica gel, using benzene and mixtures thereof with increasing amounts of ethyl acetate as developing solvents. From an eluate comprising 1 percent ethyl acetate in benzene, on evaporation of solvent and recrystallization of the residue from pentane, 17α-acetoxy-6α-methyl-3β-trimethylsiloxypregn-4-en-20-one melting at approximately 145° is obtained. The product has the formula

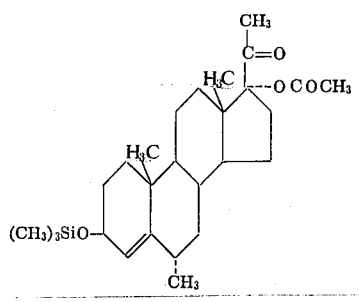

EXAMPLE 2

17α-Acetoxy-3β-ethylmethylpropylsiloxy-6α-methylpregn-4-en-20-one. To a solution of 4 parts of 17α-acetoxy-3β-hydroxy-6α-methylpregn-4-en-20-one in 50 parts of pyridine is added, with vigorous stirring, 34 parts of ethylmethylpropylchlorosilane. Stirring is continued for 10 minutes, whereupon the reactants are diluted with 200 parts of pentane. The resultant mixture is washed with water, dried over anhydrous sodium sulfate, and stripped of solvent by vacuum distillation. The residue is 17α-acetoxy-3β-ethylmethylpropylsiloxy-6α-methylpregn-4-en-20-one, having the formula

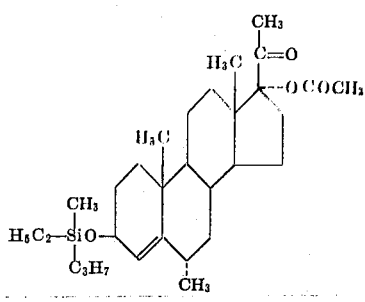

EXAMPLE 3

17α-Hexanoyloxy-6α-methyl-3β trimethylsiloxypregn-4-en-20-one. To a solution of 7 parts of 17α-hexanoyloxy-3β-hydroxy-6α-methylpregn-4-en-20-one in 75 parts of pyridine is added, with vigorous stirring, 35 parts of hexamethyldisilazane, followed by 20 parts of trimethylchlorosilane. Stirring is continued for approximately 5 minutes, whereupon the reactants are diluted with 250 parts of pentane. The resultant mixture is washed with water, dried over anhydrous sodium sulfate, and stripped of solvent by vacuum distillation. The residue is 17α-hexanoyloxy-6α-methyl-3β-trimethylsiloxypregn-4-en-20-one, having the formula

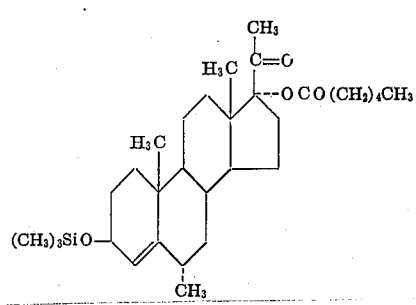

EXAMPLE 4

3β-Ethyldimethylsiloxy-17α-hexanoyloxy-6α-methyl-pregn-4-en-20-one. Substitution of 4 parts of 17α-hexanoyloxy-3β-hydroxy-6α-methylpregn-4-en-20-one and 32 parts of ethyldimethylchlorosilane for the 17α-acetoxy-3β-hydroxy-6α-methylpregn-4-en-20-one and ethylmethylpropylchlorosilane, respectively, called for in Example 2 affords, by the procedure there detailed, 3β-ethyldimethylsiloxy-17α-hexanoyloxy-6α-methylpregn-4-en-20-one, the formula of which is

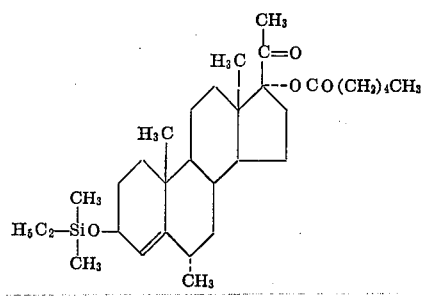

What is claimed is:

1. A compound of the formula

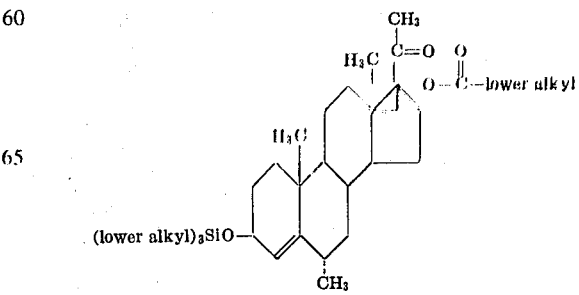

2. A compound according to claim 1 having the formula
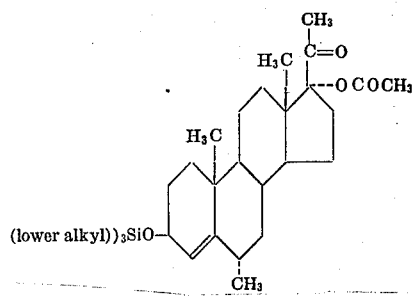
3. A compound according to claim 1 which is 17α-acetoxy-6α-methyl-3β-trimethylsiloxypregn-4-en-20-one.
* * * * *

UNITED STATES PATENT OFFICE
CERTIFICATE OF CORRECTION

PATENT NO. : 3,869,481
DATED : Mar. 4, 1975
INVENTOR(S) : Paul B. Sollman

It is certified that error appears in the above-identified patent and that said Letters Patent are hereby corrected as shown below:

Columns 1-3, that portion of the formulas reading

" 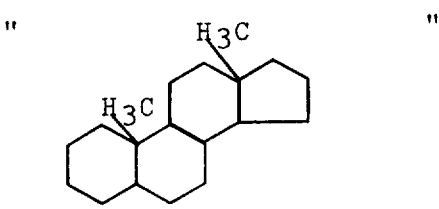 "

should read

-- 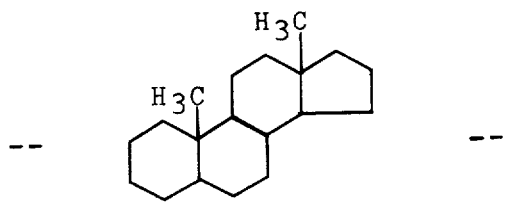 --.

Column 3, line 10, "ae" should read -- are --.

UNITED STATES PATENT OFFICE
CERTIFICATE OF CORRECTION

PATENT NO. : 3,869,481
DATED : Mar. 4, 1975
INVENTOR(S) : Paul B. Sollman

Page - 2

It is certified that error appears in the above-identified patent and that said Letters Patent are hereby corrected as shown below:

Column 4, that portion of the third formula reading

"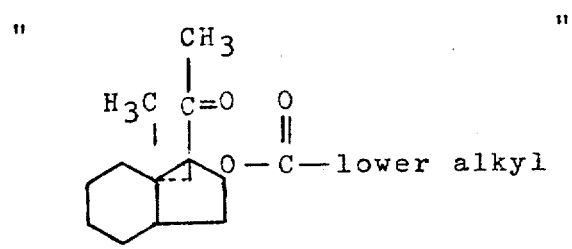"

should read

-- 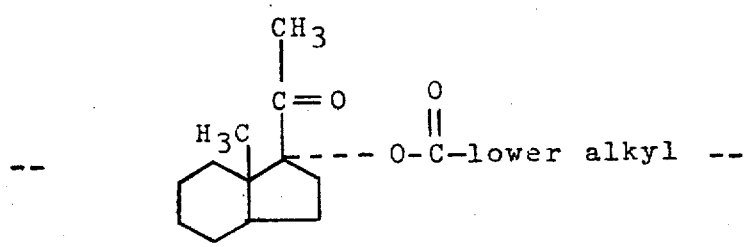 --

Signed and Sealed this fourth Day of November 1975

[SEAL]

Attest:

RUTH C. MASON
Attesting Officer

C. MARSHALL DANN
Commissioner of Patents and Trademarks